(12) United States Patent
Grife

(10) Patent No.: US 11,549,309 B2
(45) Date of Patent: Jan. 10, 2023

(54) WINDOW TREATMENT MOUNTING SYSTEM

(71) Applicant: Lippert Components, Inc., Elkhart, IN (US)

(72) Inventor: Barry Grife, Placida, FL (US)

(73) Assignee: Lippert Components, Inc., Elkhart, IN (US)

( * ) Notice: Subject to any disclaimer, the term of this patent is extended or adjusted under 35 U.S.C. 154(b) by 637 days.

(21) Appl. No.: 16/507,408

(22) Filed: Jul. 10, 2019

(65) Prior Publication Data

US 2020/0018117 A1    Jan. 16, 2020

Related U.S. Application Data

(60) Provisional application No. 62/695,914, filed on Jul. 10, 2018, provisional application No. 62/800,758, filed on Feb. 4, 2019.

(51) Int. Cl.
*E06B 9/42*      (2006.01)
*F16B 2/22*      (2006.01)

(52) U.S. Cl.
CPC . *E06B 9/42* (2013.01); *F16B 2/22* (2013.01)

(58) Field of Classification Search
CPC ..... E06B 9/42; E06B 9/46; E06B 9/24; E06B 9/48; F16B 2/22; F16B 2/205; A47H 1/13; A47H 1/10; A47H 1/12
USPC ........................................................ 160/369
See application file for complete search history.

(56) References Cited

U.S. PATENT DOCUMENTS

| | | | |
|---|---|---|---|
| 2,168,421 A * | 8/1939 | Reynolds | A47H 1/13 248/265 |
| 3,064,724 A * | 11/1962 | Nowell | A47H 1/10 248/222.12 |
| 4,228,980 A * | 10/1980 | Beauchamp | A47H 23/00 5/493 |
| 4,903,394 A | 2/1990 | Roberts | |
| 5,042,549 A | 8/1991 | Roberts | |
| 5,067,542 A * | 11/1991 | Easley | A47H 1/18 160/126 |
| 5,141,045 A | 8/1992 | Williams | |
| 5,238,044 A | 8/1993 | Gilley et al. | |
| 5,282,505 A | 2/1994 | Gilley et al. | |
| 5,361,821 A | 11/1994 | Barone | |
| 5,375,644 A | 12/1994 | Gilley et al. | |
| 5,377,740 A | 1/1995 | Gilley et al. | |
| 5,392,839 A | 2/1995 | Gilley et al. | |
| 5,417,271 A | 5/1995 | Fenley | |
| 5,501,261 A | 3/1996 | Peale | |
| 5,520,235 A * | 5/1996 | Coleman | E06B 9/323 248/261 |
| 5,878,985 A | 3/1999 | Iannone | |
| 6,085,821 A * | 7/2000 | Roberts | A47H 19/00 160/38 |

(Continued)

FOREIGN PATENT DOCUMENTS

| | | | |
|---|---|---|---|
| AU | 391985 A | * | 5/1965 |
| CH | 1231862 B | * | 1/1967 |
| CN | 209719220 U | * | 12/2019 |

*Primary Examiner* — Beth A Stephan
(74) *Attorney, Agent, or Firm* — Nixon & Vanderhye P.C.

(57) ABSTRACT

A system for mounting a window treatment to a structure includes a beam supporting or forming a portion of the window treatment, a flange of a trim ring or an accessory thereof, and a clip connectable to the beam and to the flange.

20 Claims, 15 Drawing Sheets

(56) References Cited

U.S. PATENT DOCUMENTS

| | | |
|---|---|---|
| 6,431,247 B1 | 8/2002 | Harrison, Jr. et al. |
| 8,347,936 B2 | 1/2013 | Martin et al. |
| 9,119,497 B2 | 9/2015 | Sanchuk |
| 9,427,102 B2 | 8/2016 | Weaver |
| 9,498,079 B2 | 11/2016 | Sanchuk |
| 9,999,312 B2 | 6/2018 | Taylor |

* cited by examiner

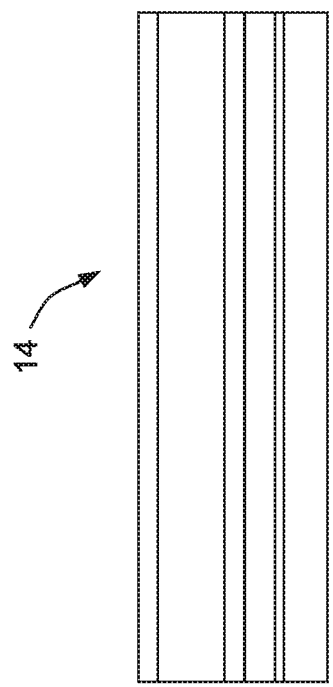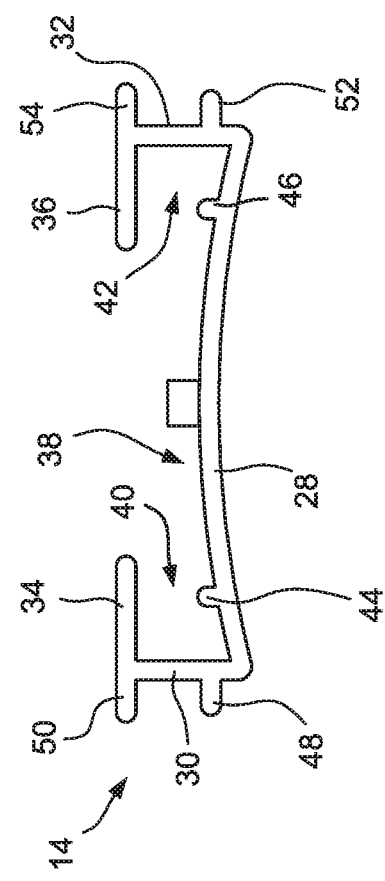

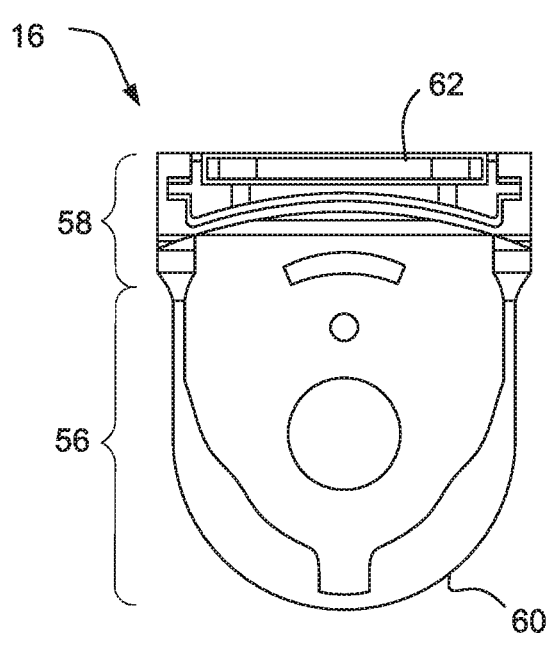 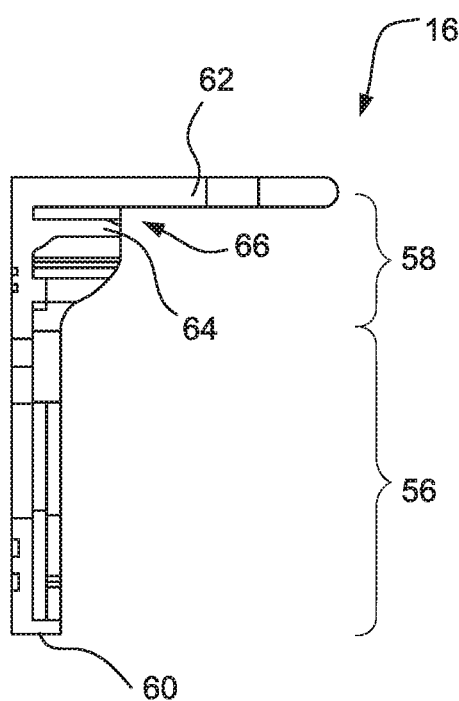
FIG. 6A FIG. 6B
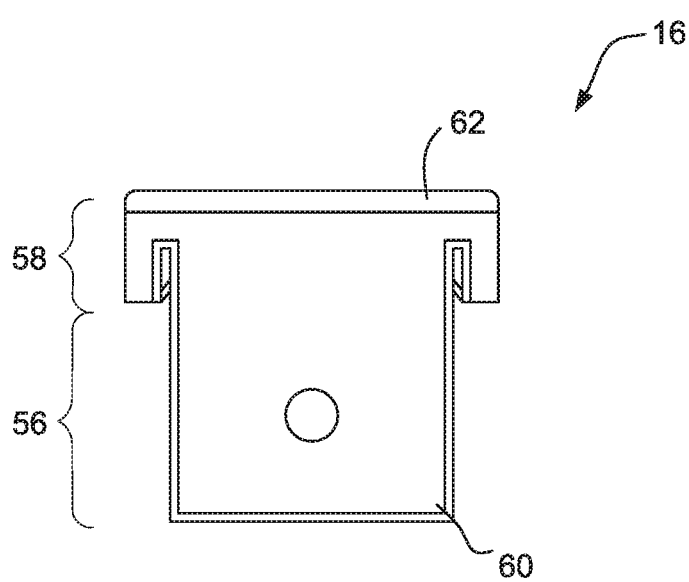
FIG. 6C

WINDOW TREATMENT MOUNTING SYSTEM

CROSS-REFERENCES TO RELATED APPLICATIONS

This application claims the benefit of U.S. Provisional Patent Application No. 62/695,914 filed Jul. 10, 2018 and U.S. Provisional Patent Application No. 62/800,758 filed Feb. 4, 2019, the entire content of each of which is herein incorporated by reference.

STATEMENT REGARDING FEDERALLY SPONSORED RESEARCH OR DEVELOPMENT (Not Applicable)

BACKGROUND AND SUMMARY

A roller blind typically includes a roller tube, a blind material, for example, a blind fabric, attached and selectively rollable onto an outer surface of the roller tube, a spindle received within the roller tube, and a coil spring connected between the roller tube and the spindle. Such a roller blind typically is mounted to a first bracket that receives and supports a first end of the spindle and a second bracket that receives and supports a second end of the spindle. The first bracket and the first end of the spindle may be, but need not be configured so that the first end of the spindle may rotate freely with respect to the first bracket when received therein. The second bracket and the second end of the spindle typically are configured so that the second end of the spindle is keyed to the second bracket when received therein and, therefore, generally is rotatably fixed with respect thereto.

Such a roller blind and first and second brackets typically are provided as separate and distinct components. Installing such a blind and bracket system to a structure, for example, a window frame or a wall surrounding a window frame, requires precise placement of the brackets with respect to the roller and spindle. If the brackets are mounted to the structure too close to each other or too far apart from each other, it may be impossible to install the roller blind between them in an operable manner. The acceptable tolerance in the spacing between the two brackets may be very small. As such, installing such a blind and bracket system to a structure may be time consuming and error prone.

This disclosure is directed to a system for mounting a window treatment to a window frame or window trim ring that overcomes drawbacks with existing designs.

In an exemplary embodiment, a system includes a beam having a generally C-shaped cross-section defining a first channel and a second channel, and a clip having a generally C-shaped cross-section. The clip includes a base, a first arm extending from the base and having a free end, and a second arm extending from the base and having a free end. The system also includes a trim ring with a peripheral flange. A shoulder portion of the first arm proximate the base is receivable in the first channel, and a shoulder portion of the second arm proximate the base is receivable in the second channel. The first arm defines a pocket proximate the free end thereof that faces the second arm proximate the free end thereof, and the second arm defines a barb proximate the free end thereof that faces the first arm proximate the free end thereof. The first arm and the second arm are configured to receive the flange between the receiver and the barb.

The beam, the first channel, and the second channel may be elongated. The beam may be substantially rigid and the clip may be substantially flexible and resilient. In this context, the clip may be flexibly and resiliently reconfigurable between a first configuration in which the free ends of the first and second arms may be proximate each other and a second configuration in which the free ends of the first and second arms may be distant from each other. The beam and the clip may be configured so that the clip may be readily assembled to and disassembled from the beam when the clip is in the first configuration and so that the clip may be substantially secured to the beam when the clip is in the second configuration. The clip further may be flexibly and resiliently reconfigurable between the second configuration and a third configuration where the free ends of the first and second arms may be more distant from each other than in the second configuration. The clip may be in the third configuration when the flange is received between the receiver and the barb. The flange and the free ends of the clip may cooperate to inhibit displacement of the first arm from the first channel and displacement of the second arm from the second channel. The barb may be configured to resist disengagement of the clip from the flange. The free end of the first arm may be generally parallel to the free end of the second arm, and the The system may also include a window treatment connected to the beam.

In another exemplary embodiment, a clip for use with a beam and a trim ring includes a base, a first arm extending from the base and having a free end, and a second arm extending from the base and having a free end. A portion of the first arm proximate the base end is receivable in the first channel, and a portion of the second arm proximate the base is receivable in the second channel. The first arm defines a pocket proximate the free end thereof that faces the second arm proximate the free end thereof, and the second arm defines a barb proximate the free end thereof that faces the first arm proximate the free end thereof. The first arm and the second arm are configured to receive the flange between the receiver and the barb.

In yet another exemplary embodiment, a system includes a beam having a generally C-shaped cross-section defining a first channel and a second channel, a trim ring cooperable with a window frame, and a clip securable to the trim ring and interposed between the trim ring and the beam. The clip includes a first connector engaging the first channel, a second connector engaging the second channel, and extension arms engaging the trim ring.

The first connector may engage an interior of the first channel, and the second connector may engage an interior of the second channel. The trim ring may define a peripheral flange, and the extension arms may engage an exterior of the peripheral flange.

The first connector may engage an exterior of the first channel, and the second connector may engage an exterior of the second channel. In this context, the first connector may include a first beam gripping portion engaging the first channel, and the second connector may include a second beam gripping portion engaging the second channel. The trim ring may include a first C-shaped channel defining a first T-shaped slot and a second C-shaped channel defining a second T-shaped slot, where the extension arms may be trim ring engaging portions engaging one of the first and second T-shaped slots. The first and second C-shaped channels may face opposite directions.

BRIEF DESCRIPTION OF THE DRAWINGS

These and other aspects and advantages will be described in detail with reference to the accompanying drawings, in which:

FIG. 4A is an end elevation view of the beam of FIG. 1;

FIG. 4B is a side elevation view of the beam of FIG. 1;

FIG. 6A is an inside end elevation view of a roller blind support according to the present disclosure;

FIG. 6B is a side elevation view of the roller blind support of FIG. 6A;

FIG. 6C is a top plan view of the roller blind support of FIG. 6A;

DETAILED DESCRIPTION

Figure 1:
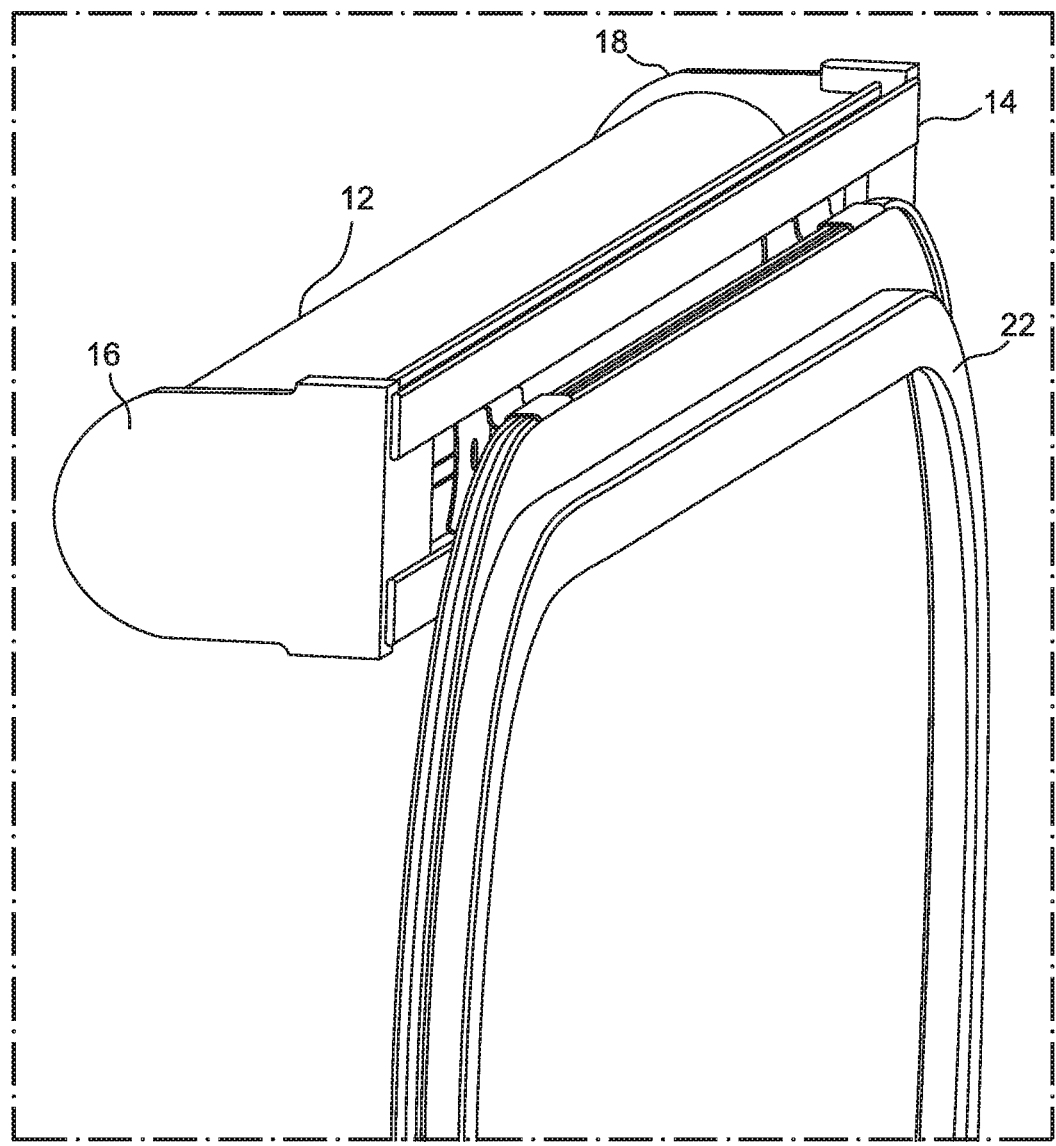
FIG. 1 is perspective view of an illustrative system including a roller blind connected to a window trim ring through an intervening clip, beam, and roller blind support assembly according to the present disclosure.
Figure 2A:
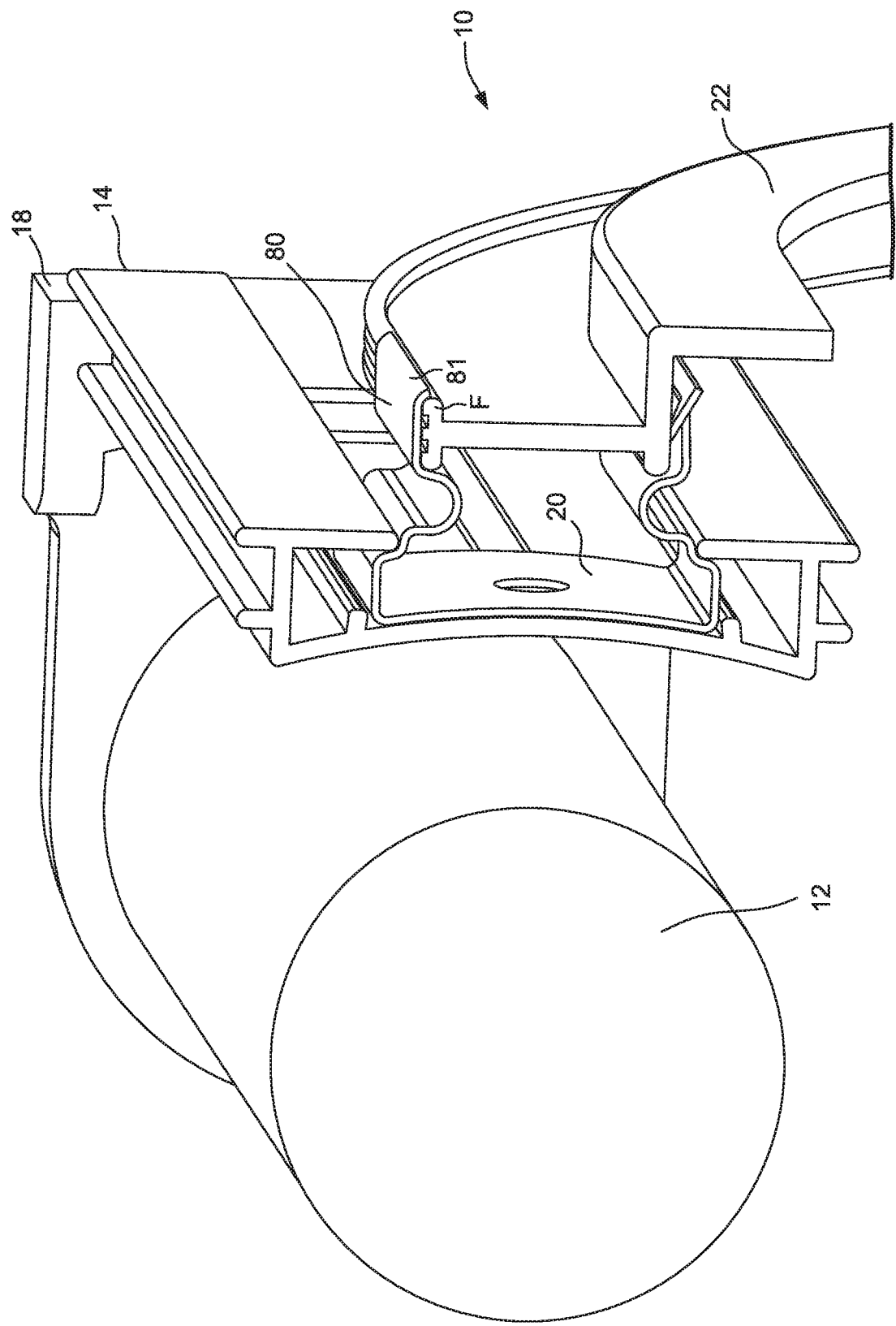
FIG. 2A is an enlarged, sectional view of the system of FIG. 1.
Figure 2B:
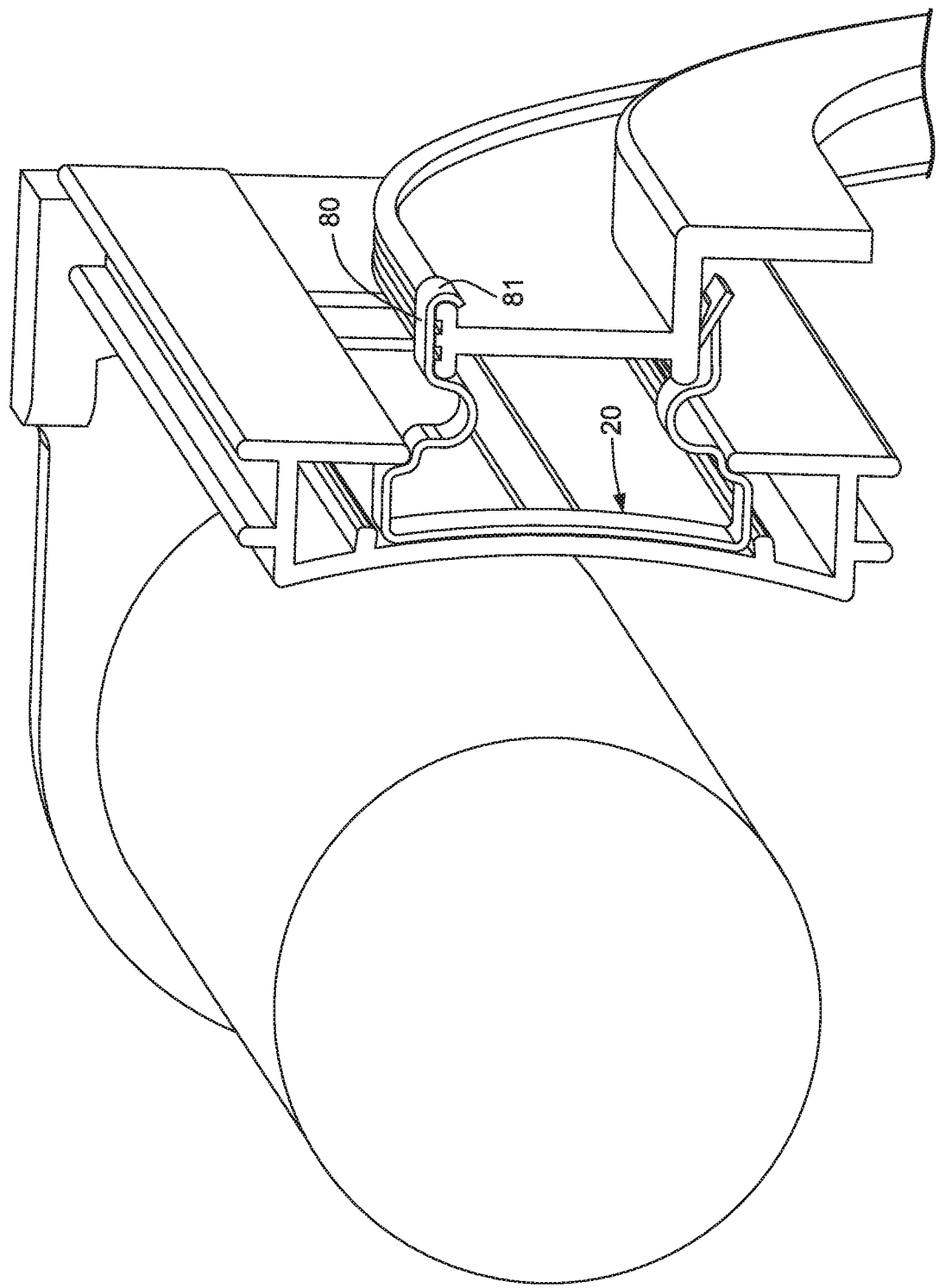
FIG. 2B is an enlarged, sectional view of the system of FIG. 1 including an illustrative, alternative clip.
Figure 3A:
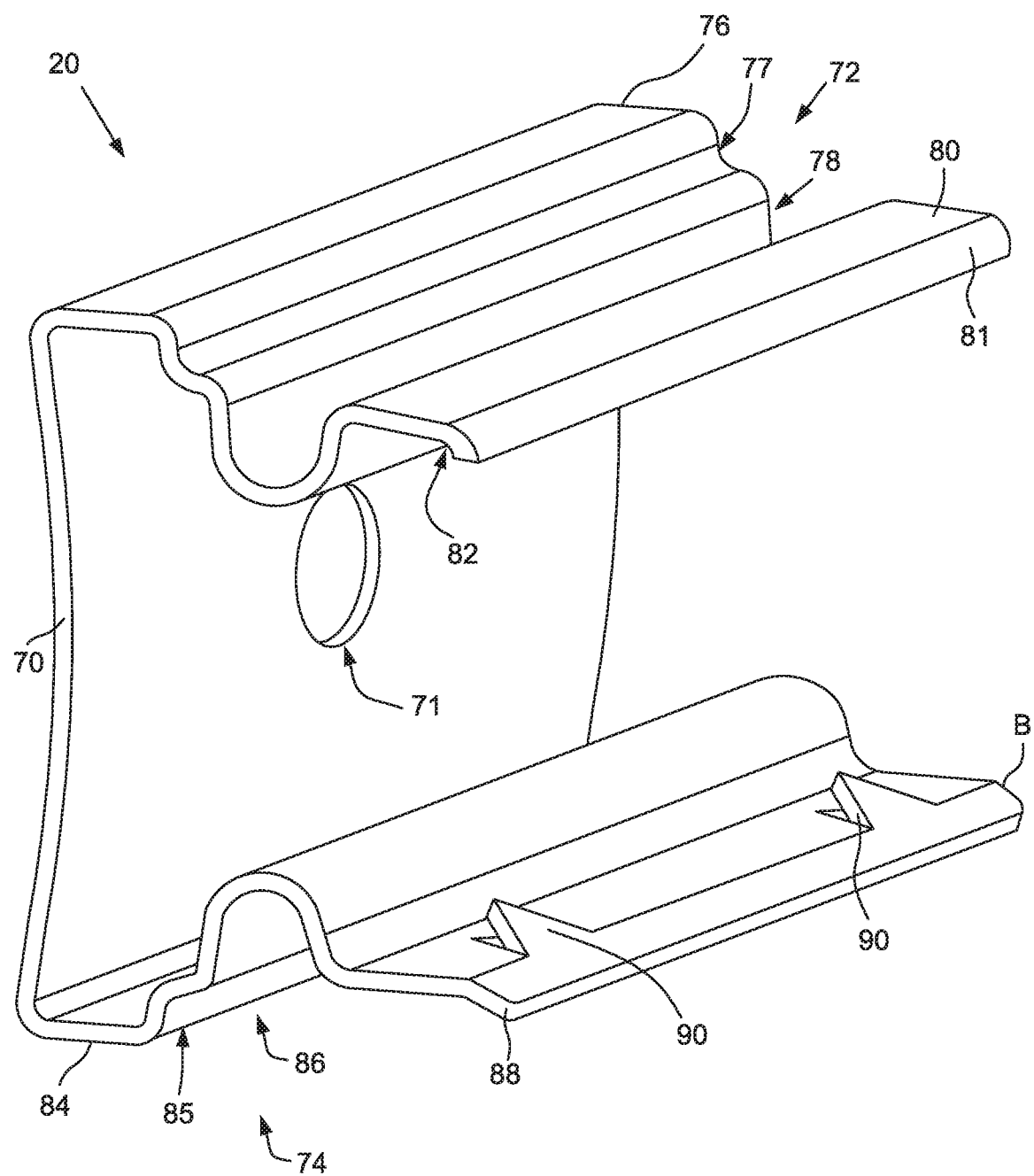
FIG. 3A is a perspective view of the clip of FIGS. 1 and 2A.
Figure 3B:
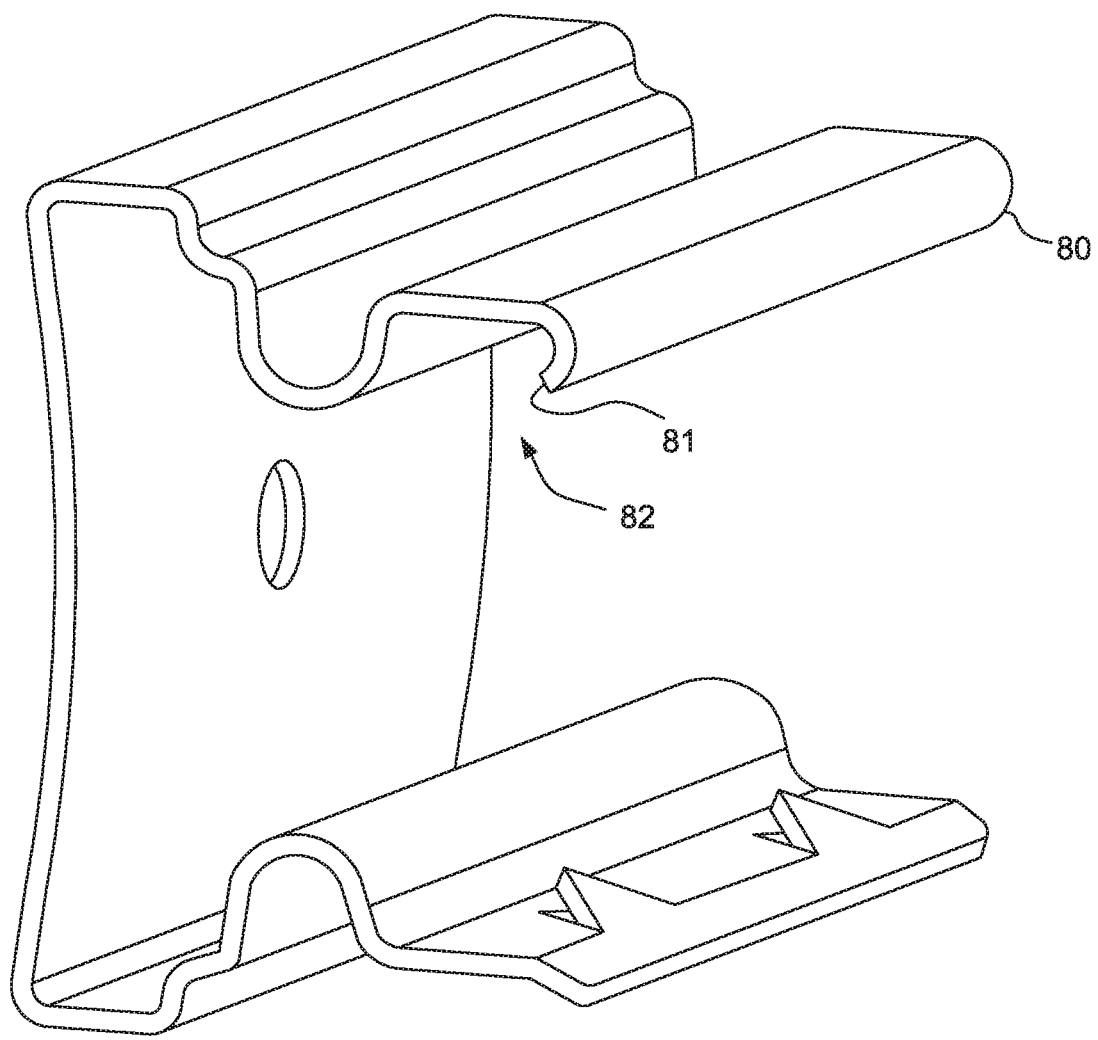
FIG. 3B is a perspective view of the clip of FIG. 2B.
Figure 3C:
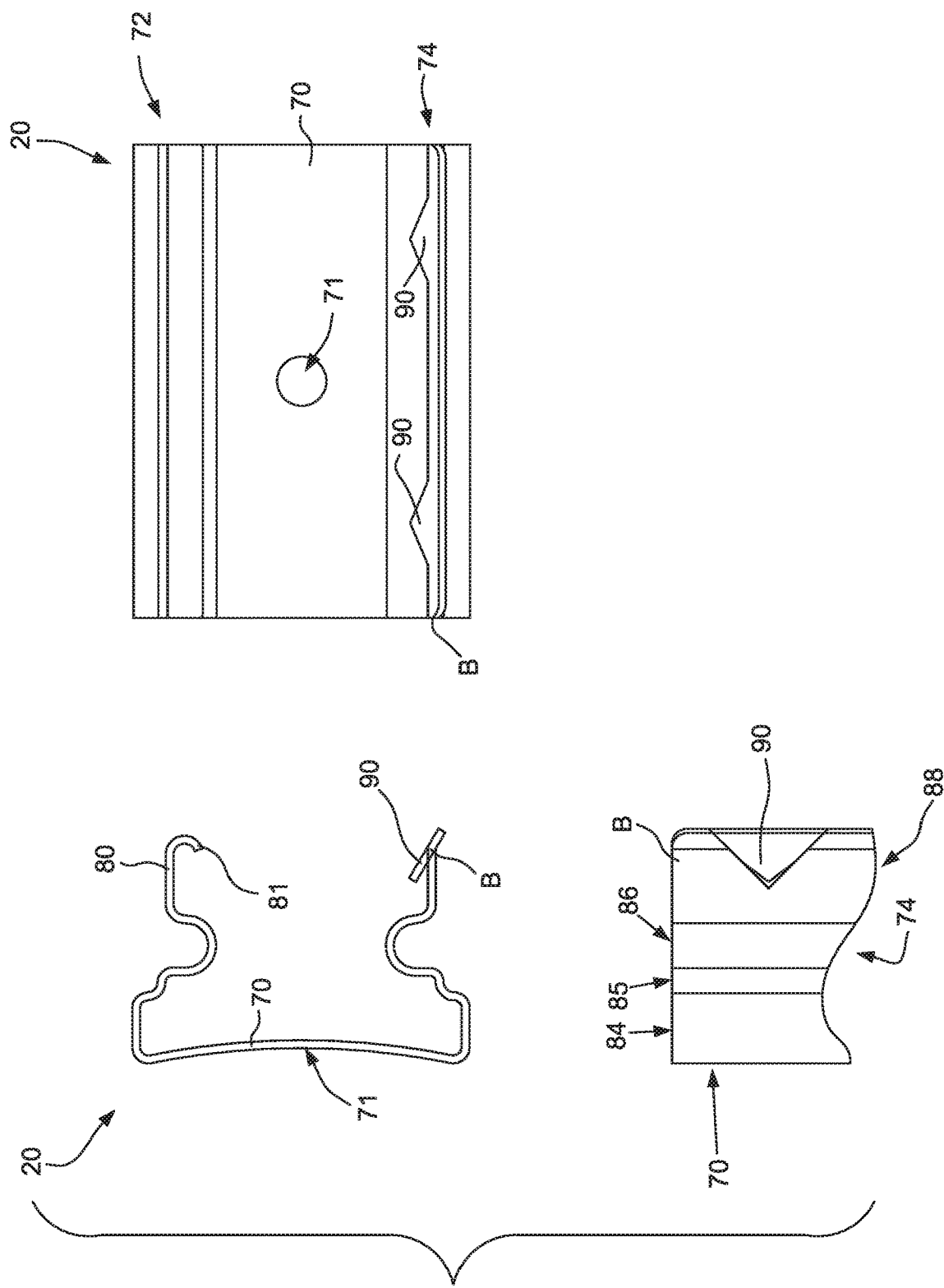
FIG. 3C is several views of the clip of FIG. 2B.

FIGS. 1-6C show illustrative embodiments of a window treatment mounting system 10 including a roller blind assembly 12 (hereinafter sometimes referred to as a roller blind) connected to an elongated beam 14 by first and second roller blind supports 16, 18, and a clip 20 configured for connection to the beam 14 and to a window frame trim ring 22. The trim ring 22 could, but need not, function as a window frame clamp ring to secure a corresponding window frame to a wall of a structure, as will be discussed further below.

The roller blind 12 may be a conventional roller blind having a roller tube, a spindle received within the roller tube, and a blind material, for example, a blind fabric, attached to, rollable onto, and unrollable from the roller tube. A spring (not shown) may be connected between the roller tube and the spindle in a conventional manner to selectively bias the roller tube for rotation with respect to the spindle.

The beam 14, as shown, has a generally C-shaped cross section. The beam 14 includes a web 28 having a first end and a second end, a first flange 30 extending from the first end of the web, a second flange 32 extending from the second end of the web, a first return 34 extending from an end of the first flange opposite an end thereof connected to the web, and a second return 36 extending from an end of the second flange opposite an end thereof connected to the web.

The web 28, the first flange 30, the second flange 32, the first return 34, and the second return 36 cooperate to define the C-shaped cross section and an interior region 38 of the beam 14. The web 28, the first flange 30, and the first return 34 cooperate to define a first channel 40. The web 28, the second flange 32, and the second return 36 cooperate to define a second channel 42.

First and second elongated and parallel ribs 44, 46 extend from an inner surface of the web 28 into the interior region 38 of the beam 14. The first rib 44 extends into the first channel 40, toward the first return 34. The second rib 46 extends into the second channel 42, toward the second return 36. Third and fourth elongated and parallel ribs 48, 50 extend from an outer surface of the first flange 30 outwardly from the interior region 38. Fifth and sixth ribs 52, 54 extend from an outer surface of the second flange 32 outwardly from the interior region 38.

The fourth and sixth ribs 50, 54 may be coextensive with the first and second returns 34, 36, respectively.

The beam 14 may be formed as an extrusion, for example, an aluminum extrusion.

The first roller blind support 16 includes a roller engaging portion 56 and a beam engaging portion 58 connected to the roller engaging portion. The roller engaging portion 56 is configured to receive the first end of the roller blind assembly 12. The beam engaging portion 58 is configured to be received by the first end of the beam 14.

As best shown in FIGS. 6A-6C, the first roller blind support 16 may be embodied as a generally L-shaped bracket having a first arm 60 and a second arm 62 generally perpendicular to the first arm. The first arm 60 generally corresponds to the roller engaging portion 56, and the second arm 62 generally corresponds to the beam engaging portion 58. The bounds of the roller engaging portion 56 and a beam engaging portion 58 as shown in the drawings are approximate and not limiting.

The first arm 60 is generally tombstone-shaped, that is, generally rectangular with a bull-nosed (or semi-circular) free end. The diameter of the semi-circular free end is complementary to the diameter of the roller tube with the blind material wound thereon. The diameter of the semi-circular free end may be at least slightly greater than the diameter of the roller tube with the blind material wound thereon. The first arm 60 is configured to receive the spindle of the roller blind 12 in keyed engagement so that the roller tube may rotate freely with respect to the first roller blind support 16 but the spindle may not freely rotate with respect to the first roller blind support. The engagement between the spindle and the first arm 60 may be direct or indirect.

That is, the spindle may be directly received by and keyed to the first arm 60, or the spindle may be received by and keyed to an intervening component that, in turn is received by and keyed to the first arm.

The second arm 62 of the beam engaging portion 58 is configured to be received within the first and second channels 40, 42 at the first end of the beam in snug engagement. The beam engaging portion 58 also includes a tongue 64. The second arm 62 and the tongue 64 cooperate to define a channel 66 configured to receive the web 28 of the beam 14 in snug engagement. The foregoing interaction between the first roller blind support 16 and the beam 14 may be sufficient to retain the first roller blind support to the beam for normal use and operation of the system 10.

In an embodiment, additional means may be employed to retain the first roller blind support 16 to the beam 14.

The second roller blind support 18 may generally be the mirror image of the first roller blind support 16. As such, the second roller blind support 18 will not be discussed in the same level of detail as the first roller blind support 16. The second roller blind support 18 may differ from the first roller blind support 16 in certain ways. For example, whereas the first roller blind support 16 is described as supporting the first end of the spindle in keyed engagement, the second roller blind support 18 could, but need not, support the second end of the spindle in keyed engagement. Instead, the second roller blind support 18 could simply support the spindle so that the roller tube may rotate with respect to the second roller blind support 18. In an embodiment, the key feature could be omitted from the first roller blind support 16 and the first end of the spindle and included in the second roller blind support 18 and the second end of the spindle instead.

The clip 20, as shown, has a generally C-shaped cross section. The clip 20 includes a base 70 having a first end and a second end, a first arm 72 extending from the first end of the base, and a second arm 74 extending from the second arm of the base. As shown, the base 70 has a contour generally complementary to the contour of the web 28 of the beam 14. The base 70 may, but need not, define a hole 71 configured to receive a rivet or other fastener (not shown) that may be used to secure the clip 20 to the beam 14 when the clip is assembled thereto, as will be discussed further below.

The first arm 72 is shaped to define a first shoulder 76, a first notch 77, a first spring portion 78, and a first free end portion 80. The first shoulder 76 is configured to be received within the first channel 40 of the beam 14 with little or no play therebetween. The first free end portion 80 terminates in a hook 81. The first spring portion 78 and the first free end portion 80 including the hook 81 cooperate to define a pocket 82 configured to receive therein a flange F of the trim ring 22 or an accessory, for example, a clamp ring or installation ring, thereof, as will be discussed further below. The hook 81 may, but need not, return toward the base 70 of the clip. FIGS. 1, 2A, 3A, and 5A show an embodiment wherein the hook 81 does not return toward the base 70, and FIGS. 2B, 3B, 3C, and 5B show an embodiment wherein the hook 81 does return toward the base. The first spring portion 78 is configured to allow the first free end portion 80 to flex resiliently with respect to the first shoulder 76.

The second arm 74 is shaped to define a second shoulder 84, a second notch 85, a second spring portion 86, and a second free end portion 88. The second shoulder 84 is configured to be received within the second channel 42 of the beam 14 with little or no play therebetween. The second free end portion 88 defines first and second (or more or fewer) barbs 90 facing the first free end portion 80. The barbs 90 are configured to engage with the flange F of the trim ring 22, as will be discussed further below. The second spring portion 86 is configured to allow the second free end 88 portion to flex resiliently with respect to the second shoulder 84. The barbs 90 may be formed by lancing the second free end portion 88 and bending it along a bend line B so that the lanced barbs extend out of the plane of the second free end portion.

The clip 20 may be made of spring steel or another suitable flexible and resilient material.

In an embodiment, the clip 20 may be assembled to the beam 14 by sliding the clip from one of the first and second ends of the beam toward the other of the first and second ends of the beam. This may be facilitated by squeezing the first arm 72 and the second arm 74 of the clip 20 toward each other into a first configuration, thereby displacing the first shoulder 76 and the second shoulder 84 toward each other, and displacing the first notch 77 and the second notch 85 toward each other. With the clip 20 placed in a desired location with respect to the beam 14, the first and second arms 72, 74 may be released into a second configuration so that the first shoulder 76 bears against the first channel 40, the second shoulder 84 bears against the second channel 42, the first notch 77 bears against the first return 34, the second notch 85 bears against second return 36, and the base 70 of the clip 20 bears against the web 28 of the beam 14. The clip 20 may be assembled to the beam 14 in any other suitable manner, as well. Additional clips 20 may be assembled to the beam 14 in any suitable manner. A rivet or other fastener (not shown) may be inserted through the hole 71 defined by the base 70 of the clip 20 and through a corresponding hole defined by the web 28 of the beam 14 to secure the clip to the beam.

The roller blind 12 and the first and second roller blind supports 16, 18 may be assembled to the beam 14 as follows. The beam engaging portion 58 of the first roller blind support 16 may be engaged with the first end of the beam 14 as discussed above. The first end of the roller blind 12 may be received by the roller engaging portion 56 of the first roller blind support 16 as discussed above. The second end of the roller blind 12 may be received by the roller engaging portion 56 of the second roller blind support 18 as discussed above. The beam engaging portion 58 of the second roller blind support 18 may be engaged with the second end of the beam 14 as discussed above. The foregoing steps may be performed in any possible sequence. Some steps may be performed simultaneously.

Figure 5A:
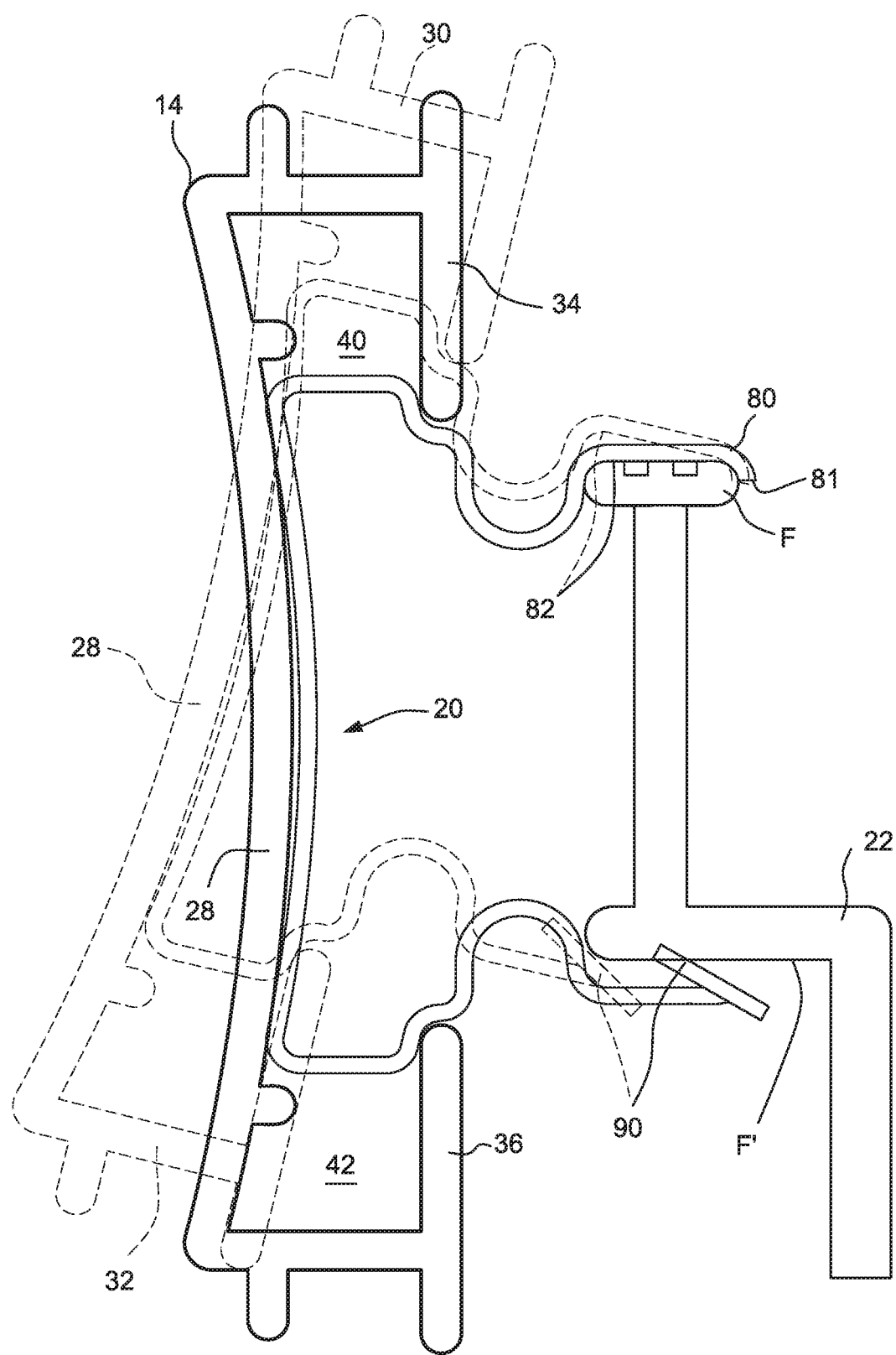
FIG. 5A is an end cross-sectional view of the beam, clip, and window frame of FIGS. 1 and 2A in first and second relative orientations with respect to each other.
Figure 5B:
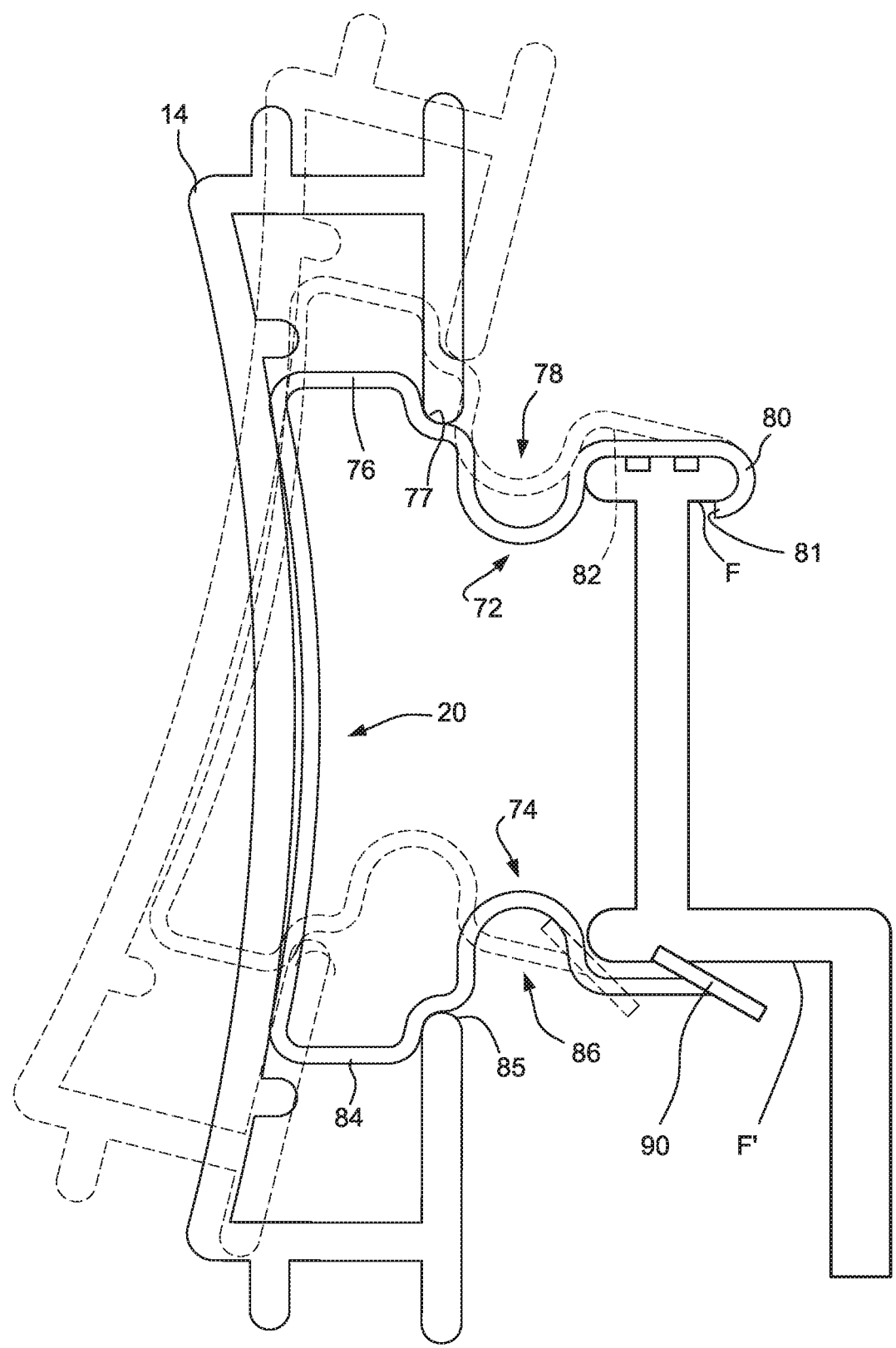
FIG. 5B is an end cross-sectional view of the beam, alternative clip, and window frame of FIG. 2B in first and second relative orientations with respect to each other.
Figure 7:
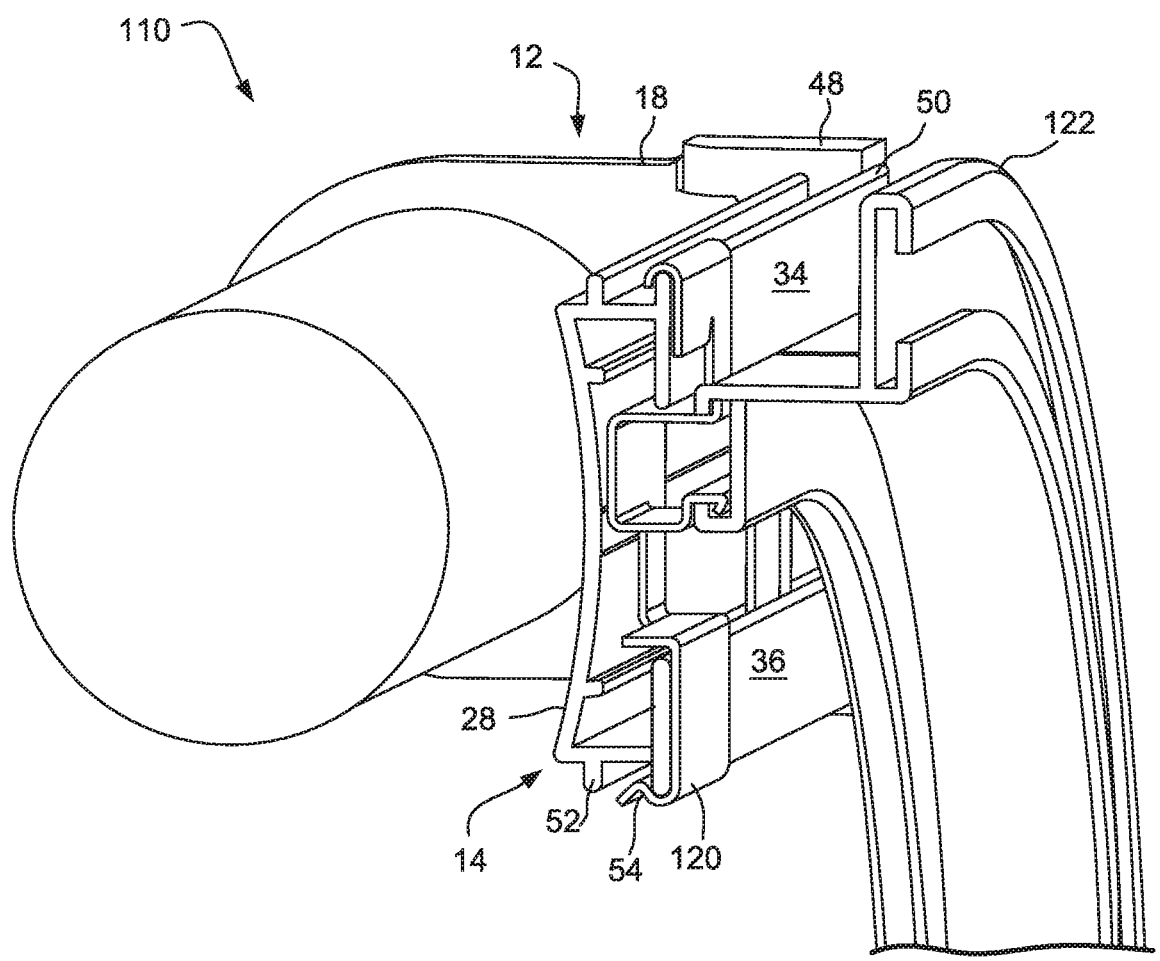
FIG. 7 is an enlarged, sectional view of the system of FIG. 1 including an alternative clip and window trim ring.
Figure 8A:
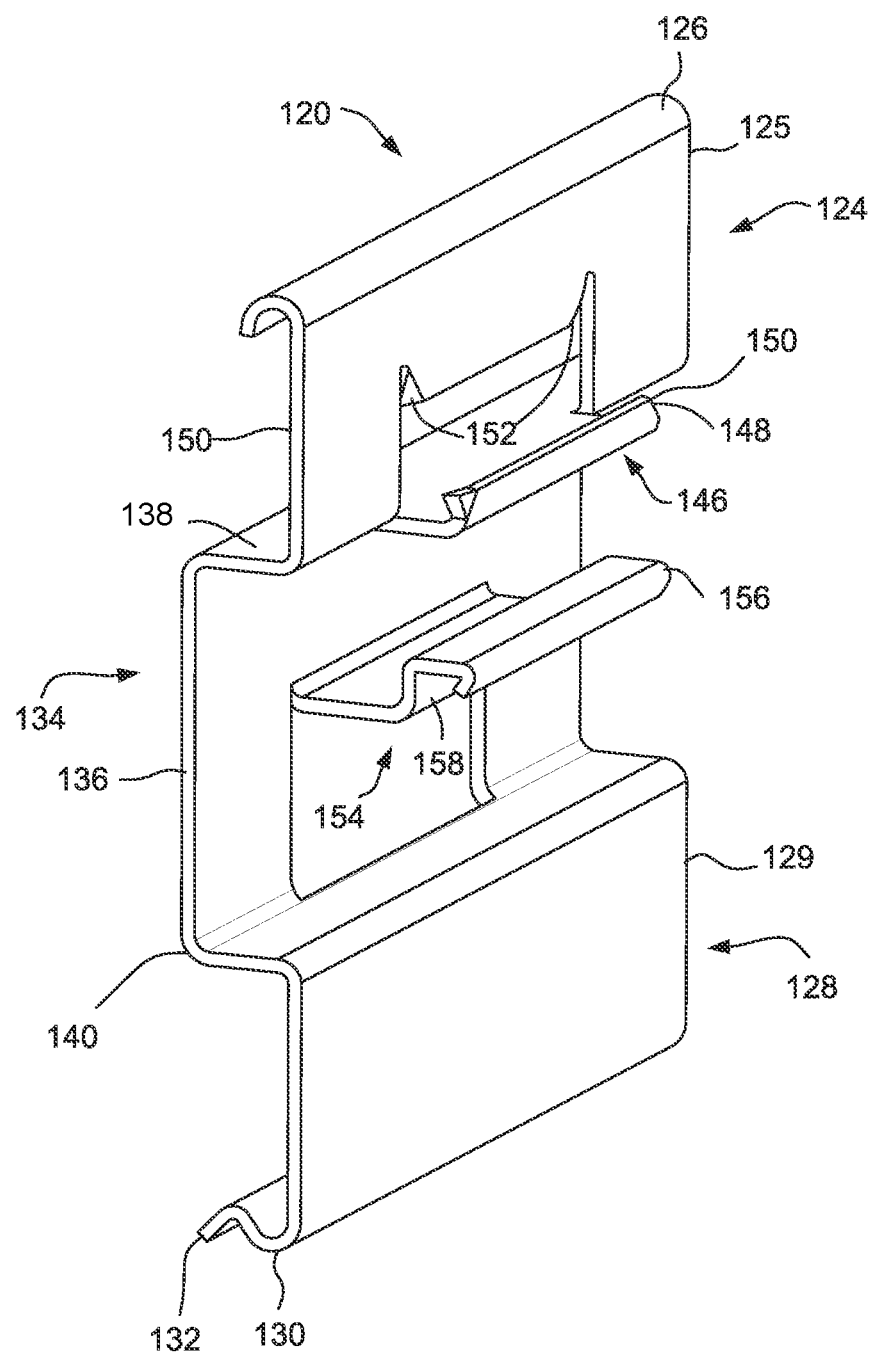
FIG. 8A is a perspective view of the clip of FIG. 7.
Figure 8B:
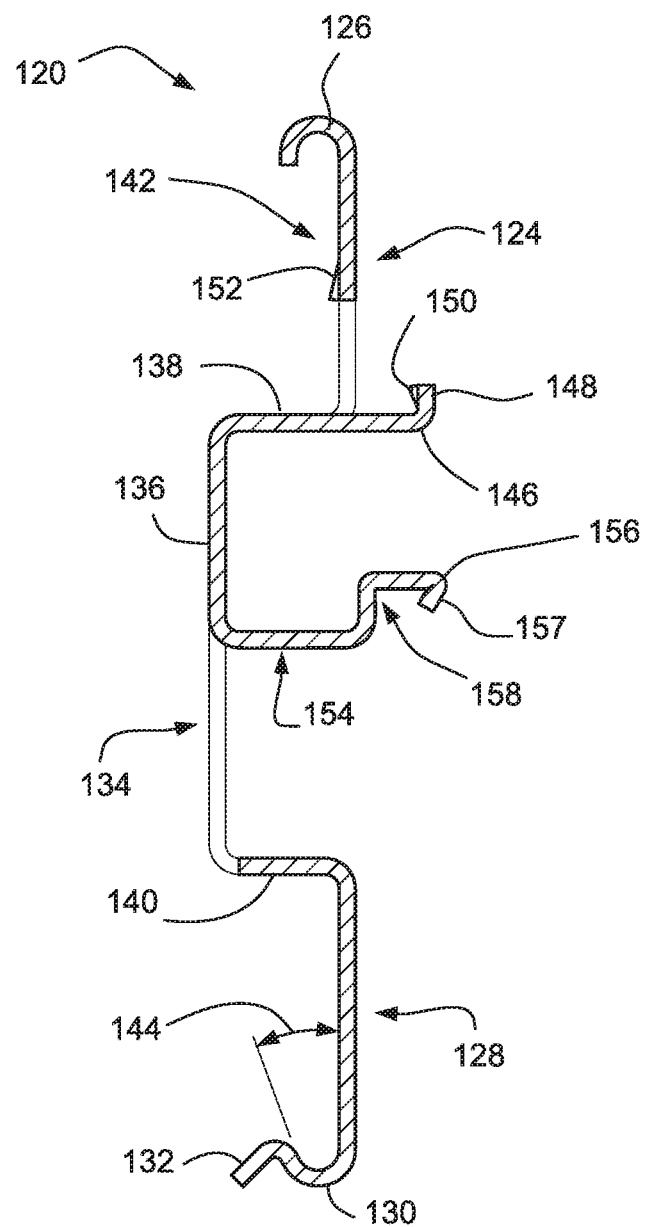
FIG. 8B is an end view of the clip of FIG. 7.

As best shown in FIGS. 5A and 5B, the foregoing beam 14 and clip 20 assembly may be assembled to the trim ring 22 by hooking the pocket 82 upon the flange F of the trim ring (as shown in phantom in FIGS. 5A and 5B) and then rotating the beam and clip assembly so that the barbs 90 first abut and then extend across an opposing flange F' of the trim ring, thereby securing the clip to the trim ring (as shown in solid line in FIGS. 5A and 5B), with the clip 20 thereby configured into a third configuration.

FIGS. 7-10B show an illustrative alternative embodiment of a window treatment mounting system 110 including the roller blind assembly 12 (hereinafter sometimes referred to as a roller blind) connected to the elongated beam 14 by first and second roller blind supports 16, 18, and an alternative clip 120 configured for connection to the beam 14 and to an alternative window frame trim ring 122.

The clip 120 includes a first elongated, J-shaped, beam gripping portion 124 having a generally planar flange 125 and a hooked free end 126, and a second elongated, J-shaped, beam gripping portion 128 having a generally planar flange 129 and a hooked free end 130. The second beam gripping portion 128 further includes a reverse bevel or ramp 132 extending from the hooked end 130. The first beam gripping portion 124 is connected to the second beam gripping portion 128 by an intervening, elongated, U-shaped, connecting portion 134. As shown, the connecting portion 134 includes an elongated web 136 and first and second elongated, opposed flanges 138, 140 extending from the web. As shown, the flanges of the connecting portion are parallel to each other and perpendicular to the web. The flange 125 of the first beam gripping portion 124 is connected to the first flange 138 of the connecting portion 134, and the flange 129 of the second beam gripping portion 128 is connected to the second flange 140 of the connecting portion, with the hooked ends 126, 130 of the first and second beam gripping portions distant from the connecting portion. As shown, the flange 125 of the first beam gripping portion 124 may be generally co-planar with the flange 129 of the second beam gripping portion 128.

The first beam gripping portion 124 cooperates with the connecting portion 134 to define a first beam-receiving portion 142, and the second beam gripping portion 128 cooperates with the connecting portion to define a second beam-receiving portion 144. The first beam-receiving portion 142 is configured to receive the first return 34 and the fourth rib 50 of the beam 14, and the second beam receiving portion 144 is configured to receive the second return 36 and the sixth rib 54 of the beam 14.

A first trim ring gripping portion 146 extends from the first flange 138 of the connecting portion 134, generally coplanar therewith. The first trim ring gripping portion 146 may be formed, for example, by lancing or otherwise separating an interior portion of the flange 125 of the first beam gripping portion 124 from the remainder of the flange 125 and reorienting the interior portion generally perpendicular to the remainder of the flange 125 and generally coplanar with the first flange 138 of the connecting portion 134. Alternatively, the first trim ring gripping portion 146 could extend from the web 136 of the connecting portion 134 or from the flange 125 of the first beam gripping portion, generally parallel to the first flange 138 of the connecting portion 134.

The free end of the first trim ring gripping portion 146 is configured as a hooked end 148.

Free corners 150 of the hooked end 148 are configured as first or trim ring gripping barbs 150 directed toward the flange 125 of the first beam gripping portion 124.

Second or beam gripping barbs 152 extend from the flange 125 of the first beam gripping portion 124 into the first beam receiving portion 142.

A second trim ring gripping portion 154 extends from the web 136 of the connecting portion 134, generally perpendicular thereto. The second trim ring gripping portion 154 may be formed by lancing or otherwise separating an interior portion of the web 136 of the connecting portion 134 from the remainder of the web 136 and reorienting the interior portion generally perpendicular to the remainder of the web 136. Alternatively, the second trim ring gripping portion 154 could extend from the second flange 140 of the connecting portion 134 or from the flange 129 of the second beam gripping portion, generally parallel to the second flange 140 of the connecting portion 134.

The free end of the second trim ring gripping portion 154 is configured as a hooked end 156 including a ramp 157. An intermediate portion of the second trim ring gripping portion 154 is bent or otherwise configured to define a land or trim ring bearing surface 158, generally parallel to the web 136 and to the flanges 125, 129 of the first and second beam gripping portions 124, 128. As shown, the land 158 may generally define a plane separated from a plane defined by the web 136 by a plane defined by the flanges 125, 129 of the first and second beam gripping portions 124, 128.

Figure 9A:
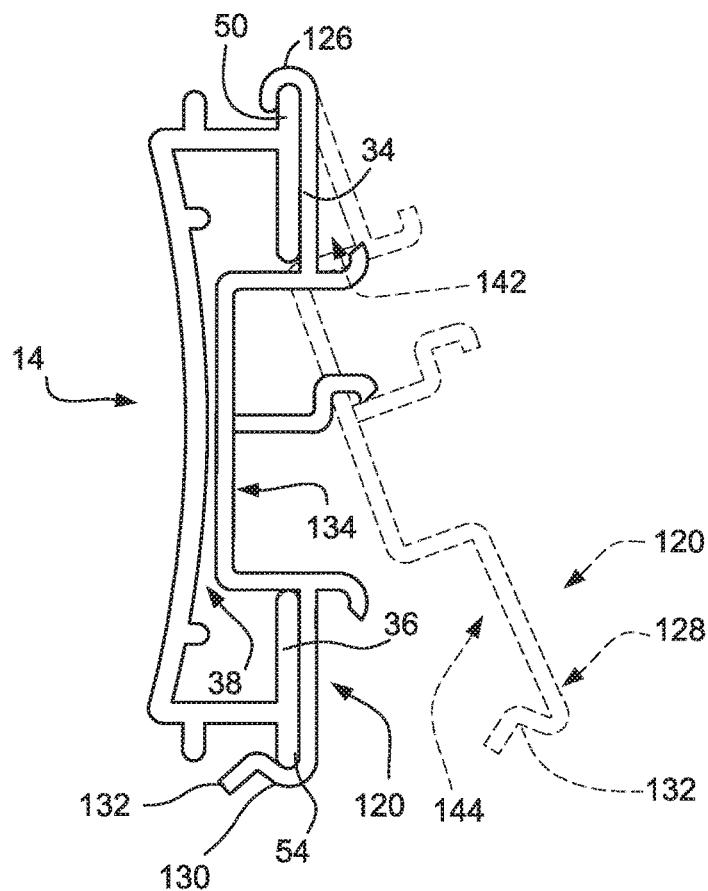
FIG. 9A is an end cross-sectional view of the beam and clip of FIG. 9A in first and second relative orientations with respect to each other.
Figure 9B:
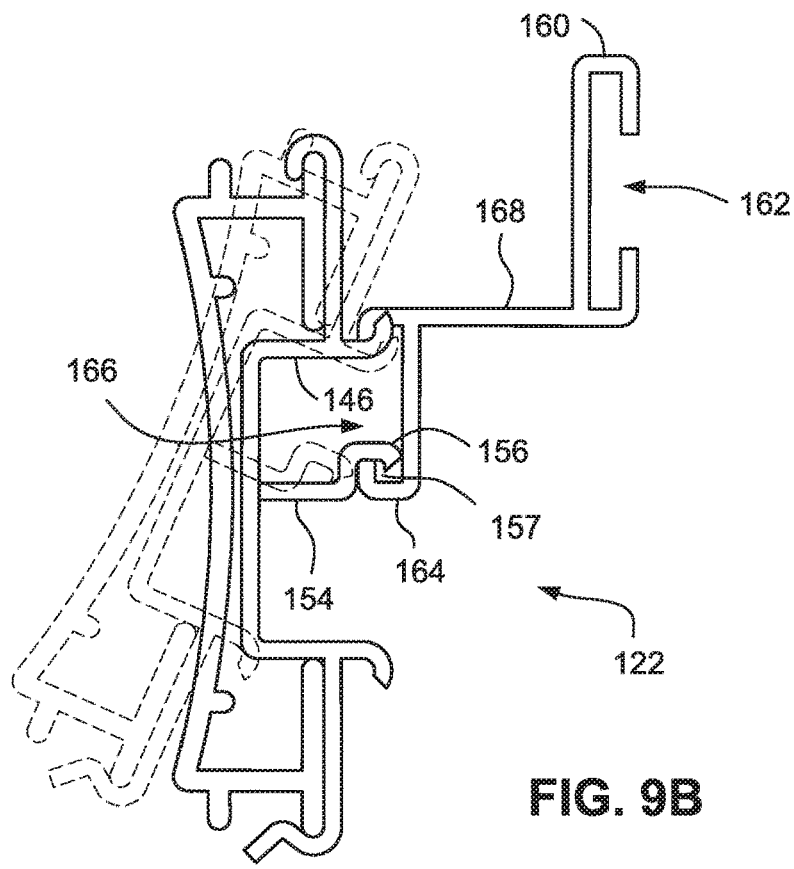
FIG. 9B is a side cross-sectional view of the beam, clip, and trim ring of FIG. 9B in first and second relative orientations with respect to each other.

As shown in FIG. 9A, the clip 120 may be connected to the beam 14 by engaging the fourth rib 50 of the beam with the hooked end 126 of the first beam gripping portion 124 of the clip, rotating the clip and beam with respect to each other so that the fourth rib and the first return 34 of the beam are received within the first beam receiving portion 142 of the clip, the connecting portion 134 of the clip is received within the interior region 38 of the beam, and the sixth rib 54 and the second return 36 of the beam are received within the second beam receiving portion 144 of the clip. As the clip 120 and the beam 14 are further rotated with respect to each other, the ramp 132 of the second beam gripping portion of the clip engages with the free end of the sixth rib 54. Additional rotation of the clip 120 with respect to the beam 14 causes one or more of the ramp 132, the hooked end 130, and the flange 129 to deflect so that the ramp may ride over the free end of the sixth rib 54. Once the ramp 132 has ridden across the free end of the sixth rib 54, the ramp 132, the hooked end 130, and/or the flange 129 resiliently return to or toward their original configurations with respect to the clip 120 generally, so that the hooked end becomes securely engaged with the free end of the sixth rib, thereby securing the clip to the beam.

With the beam 14 and clip 120 so connected, the hooked ends 125, 129 of the first and second beam gripping portions 124, 128 and the connecting portion 134 are configured to preclude inadvertent detachment of the clip from the beam. For example, application of opposing forces to the beam 14 and the clip 120, normal to the web 136 of the clip 120, would tend to flex the clip in a manner that would enhance the engagement of the first hooked end 126 with the fourth rib 50, and the engagement of the second hooked end 130 with the sixth rib 54. Also, with the beam 14 and clip 120 so connected, the second barbs 152 may engage with the fourth rib 50 or first return 34 to inhibit side-to-side motion of the clip with respect to the beam.

The clip 120 could be removed from the beam 14 by prying the hooked end 130 of the second beam gripping portion 128 away from the sixth rib 54, for example, using a suitable tool, and rotating the clip and beam away from each other in a reverse motion.

The trim ring 122 includes a first, elongated, C-shaped channel 160 defining a first T-shaped slot 162, and a second, elongated, C-shaped channel 164 defining a second T-shaped slot 166. The first channel 160 and the second channel 164 are spaced apart and connected together by an intervening bridge portion 168. The first channel 160 extends from a first side of the bridge portion 168 at or proximate a first end thereof, and the second channel 164 extends from a second side of the bridge portion at or proximate a second end thereof, the second side opposite the first side, and the second end opposite the first end. As such, the openings defined by the first slot 162 and the second slot 166 face in opposite directions. Each of the first and second channels 160, 164 is configured to receive in the respective slots 162, 166 thereof, respective ones of the first and second trim ring gripping portions 146, 154 of the clip 120.

Figure 10A:
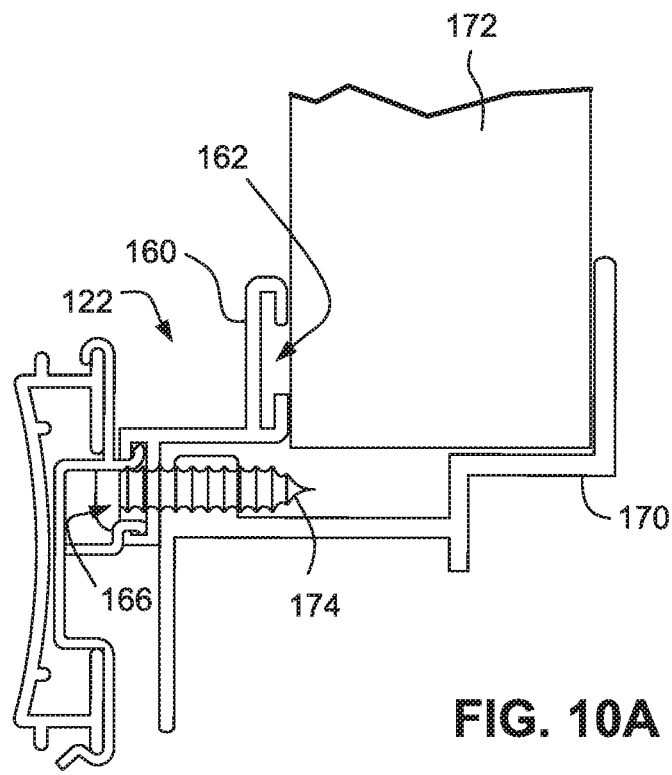
FIG. 10A is an end cross-sectional view of the system of FIG. 7 with the trim ring in a first orientation.
Figure 10B:
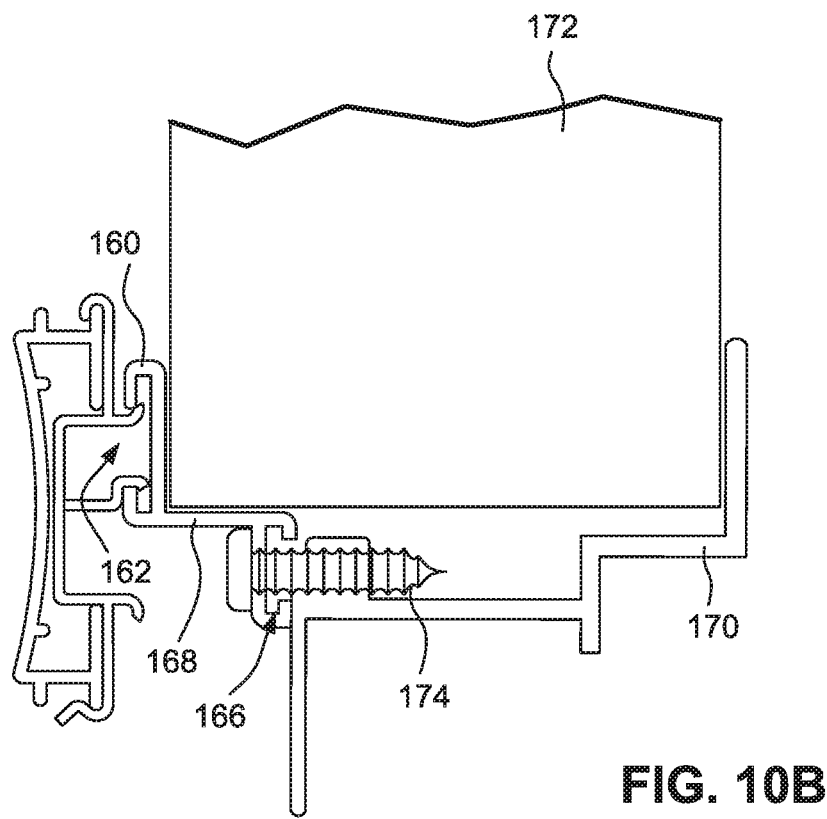
FIG. 10B is an end cross-sectional view of the system of FIG. 7 with the trim ring in a second orientation.

As shown in FIG. 10B, the clip 120 may be connected to the first channel 160 of the trim ring 122 by engaging the hooked end 148 of the first trim ring gripping portion 146 with an internal surface of the first channel, through the first slot 162, and rotating the clip with respect to the trim ring so that the ramp 157 of the hooked end 156 of the second trim ring gripping portion 154 engages an opposite side of the first slot. Additional rotation of the clip 120 with respect to the trim ring 122 causes the second trim ring gripping portion 154 to deflect so that the ramp 157 may traverse the wall defining the first channel 160 and become inserted within the first channel through the first slot. Once the ramp 157 has become inserted within the first channel 160, the second trim ring gripping portion 154 resiliently returns to or toward its original configuration with respect to the clip 120 generally, so that the hooked end 156 becomes securely engaged with the internal surface of the channel. With the clip 120 and the trim ring 122 so connected, the first barbs 150 may engage with the internal surface of the first channel 160 to inhibit side-to-side motion of the clip with respect to the trim ring.

Alternatively, the clip 120 may be connected to the second channel 164 of the trim ring 122 in a similar manner.

As shown in FIGS. 10A and 10B, the trim ring 122 may be connected to a window frame 170 by connecting the second channel 164 of the trim ring to the window frame and using the first channel 160 as a clamp member to clamp the window frame to a wall 172 in which the window frame may be installed. FIG. 10A shows the trim ring 122 connected to the window frame 170 in a first orientation by way of a screw 174 extending through an opening in the second channel 164 and into a screw-receiving boss of the window frame. In this first orientation, the surface of the first channel 160 defining the opening of the first slot 162 bears against the wall 172, thereby functioning as a clamp member to clamp the window frame 170 to the wall. FIG. 10B shows the trim ring 122 connected to the window frame 170 in a second orientation by way of a screw 174 extending through the opening in the second channel 164 and into the screw-receiving boss of the window frame. In this second orientation, the surface of the first channel 160 opposite the surface defining the opening of the first slot 162 bears against the wall 172, thereby functioning as a clamp member to clamp the window frame 170 to the wall.

The trim ring 122 may be installed in the first orientation to clamp the window frame 170 to a relatively thin wall 172, and the trim ring may be installed in the second orientation to clamp the window frame to a relatively thick wall.

In an embodiment, the beam 14 could be modified, as might be necessary, to support another form of window treatment, for example, a venetian blind or a cellular blind, instead of a roller blind.

Dimensions and material specifications that may be shown in the drawings and/or described herein are illustrative and not limiting. References to orientation should be construed in a relative, rather than absolute, sense unless context dictates otherwise. Features disclosed in connection with a given embodiment may be employed in other embodiments to the greatest possible extent.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A system comprising:
a beam having a generally C-shaped cross-section defining a first channel and a second channel;
a clip having a generally C-shaped cross-section, the clip comprising:
a base;
a first arm extending from the base and having a free end; and
a second arm extending from the base and having a free end; and
a trim ring comprising a peripheral flange;
wherein a shoulder portion of the first arm proximate the base is receivable in the first channel,
wherein a shoulder portion of the second arm proximate the base is receivable in the second channel,
wherein the first arm defines a pocket proximate the free end thereof, the pocket facing the second arm proximate the free end thereof,
wherein the second arm defines a barb proximate the free end thereof, the barb facing the first arm proximate the free end thereof, and
wherein the first arm and the second arm are configured to receive the flange between the pocket and the barb.

2. The system of claim 1, wherein the beam, the first channel, and the second channel are elongated.

3. The system of claim 1, wherein the beam is substantially rigid and the clip is substantially flexible and resilient.

4. The system of claim 3, wherein the clip is flexibly and resiliently reconfigurable between a first configuration in which the free ends of the first and second arms are proximate each other and a second configuration in which the free ends of the first and second arms are distant from each other.

5. The system of claim 4, wherein the beam and the clip are configured so that the clip may be readily assembled to and disassembled from the beam when the clip is in the first configuration and so that the clip is substantially secured to the beam when the clip is in the second configuration.

6. The system of claim 5, wherein the clip further is flexibly and resiliently reconfigurable between the second configuration and a third configuration wherein the free ends of the first and second arms are more distant from each other than in the second configuration.

7. The system of claim 6, wherein the clip is in the third configuration when the flange is received between the receiver and the barb.

8. The system of claim 7, wherein the flange and the free ends of the clip cooperate to inhibit displacement of the first arm from the first channel and displacement of the second arm from the second channel.

9. The system of claim 7, wherein the barb is configured to resist disengagement of the clip from the flange.

10. The system of claim 1 further comprising a window treatment connected to the beam.

11. The system of claim 1, wherein the free end of the first arm is generally parallel to the free end of the second arm.

12. A clip for use with a beam and a trim ring, the beam having a generally C-shaped cross-section defining a first channel and a second channel, and the trim ring defining a peripheral flange, the clip comprising:
a base;
a first arm extending from the base and having a free end; and
a second arm extending from the base and having a free end,
wherein a portion of the first arm proximate the base end is receivable in the first channel,
wherein a portion of the second arm proximate the base is receivable in the second channel,
wherein the first arm defines a pocket proximate the free end thereof, the pocket facing the second arm proximate the free end thereof,
wherein the second arm defines a barb proximate the free end thereof, the barb facing the first arm proximate the free end thereof, and
wherein the first arm and the second arm are configured to receive the flange between the pocket and the barb.

13. The system of claim 12, wherein the free end of the first arm is generally parallel to the free end of the second arm.

14. A system comprising:
- a beam having a generally C-shaped cross-section defining a first channel and a second channel;
- a trim ring cooperable with a window frame; and
- a clip securable to the trim ring and interposed between the trim ring and the beam, the clip including:
- a first connector engaging the first channel,
- a second connector engaging the second channel, and
- extension arms engaging the trim ring.

15. The system of claim 14, wherein the first connector engages an interior of the first channel, and wherein the second connector engages an interior of the second channel.

16. The system of claim 14, wherein the trim ring defines a peripheral flange, and wherein the extension arms engage an exterior of the peripheral flange.

17. The system of claim 14, wherein the first connector engages an exterior of the first channel, and wherein the second connector engages an exterior of the second channel.

18. The system of claim 17, wherein the first connector comprises a first beam gripping portion engaging the first channel, and wherein the second connector comprises a second beam gripping portion engaging the second channel.

19. The system of claim 17, wherein the trim ring comprise a first C-shaped channel defining a first T-shaped slot and a second C-shaped channel defining a second T-shaped slot, and wherein the extension arms comprise trim ring engaging portions engaging one of the first and second T-shaped slots.

20. The system of claim 19, wherein the first and second C-shaped channels face opposite directions.

* * * * *